(12) United States Patent
Loetscher et al.

(10) Patent No.: US 10,894,369 B2
(45) Date of Patent: Jan. 19, 2021

(54) APPARATUS FOR BONDING OVERLAPPING MATERIAL LAYERS

(71) Applicant: Leister Technologies AG, Kaegiswil (CH)

(72) Inventors: Roman Loetscher, Lucerne (CH); Adolf Niederberger, Kaegiswil (CH); Pascal Horat-Faessler, Lucerne (CH)

(73) Assignee: Leister Technologies AG, Kaegiswil (CH)

( * ) Notice: Subject to any disclaimer, the term of this patent is extended or adjusted under 35 U.S.C. 154(b) by 419 days.

(21) Appl. No.: 15/626,091

(22) Filed: Jun. 17, 2017

(65) Prior Publication Data

US 2018/0015676 A1    Jan. 18, 2018

(30) Foreign Application Priority Data

Jul. 14, 2016    (EP) .................................... 16179503

(51) Int. Cl.
*B29C 65/22*    (2006.01)
*B29C 65/00*    (2006.01)
(Continued)

(52) U.S. Cl.
CPC ............ *B29C 65/228* (2013.01); *B29C 65/10* (2013.01); *B29C 65/20* (2013.01); *B29C 65/224* (2013.01);
(Continued)

(58) Field of Classification Search
CPC ....... B29C 65/228; B29C 65/20; B29C 66/00; B29C 66/40; B29C 66/43; B29C 66/93;
(Continued)

(56) References Cited

U.S. PATENT DOCUMENTS 4,146,419 A * 3/1979 Neidhart ................. B29C 66/43
156/391
4,281,238 A * 7/1981 Noma ....................... H05B 3/58
138/33
(Continued)

FOREIGN PATENT DOCUMENTS

CN           1535809 A     10/2004
CN         104742410 A      7/2015
(Continued)

*Primary Examiner* — Tu B Hoang
*Assistant Examiner* — Yeong Juen Thong
(74) *Attorney, Agent, or Firm* — Von Rohrscheidt Patents

(57) ABSTRACT

An automatic bonding apparatus and a method for thermally induced seam bonding of weldable and/or gluable flat flexible material layers with each other which are each configured as a material web, material band and/or material piece and arranged so that they overlap at least partially wherein the bonding is performed by an electrically controlled contact heating arrangement through a heating wedge welding method. A temperature and/or a power of the heating wedge which is formed by a thin folded steel sheet blank is controlled as a function of a relative velocity between the material layers and the automatic bonding apparatus. This is performed so that a thermal energy that is transferred from the heating wedge to the material layers to be glued is kept constant. For this purpose the relative velocity is detected and the power of the heating wedge is automatically adjusted when the relative velocity changes.

14 Claims, 3 Drawing Sheets

(51) Int. Cl.
  *B29C 65/20* (2006.01)
  *B29C 65/30* (2006.01)
  *B29C 65/10* (2006.01)
  *B29C 65/78* (2006.01)
  B29L 31/30 (2006.01)
  B29L 31/00 (2006.01)
  B29C 65/62 (2006.01)
  B29L 31/48 (2006.01)

(52) U.S. Cl.
  CPC .......... *B29C 65/30* (2013.01); *B29C 65/7835* (2013.01); *B29C 66/1122* (2013.01); *B29C 66/43* (2013.01); *B29C 66/73921* (2013.01); *B29C 66/8122* (2013.01); *B29C 66/8167* (2013.01); *B29C 66/8187* (2013.01); *B29C 66/81417* (2013.01); *B29C 66/82261* (2013.01); *B29C 66/8362* (2013.01); *B29C 66/83413* (2013.01); *B29C 66/86521* (2013.01); *B29C 66/86523* (2013.01); *B29C 66/9131* (2013.01); *B29C 66/91213* (2013.01); *B29C 66/91231* (2013.01); *B29C 66/91421* (2013.01); *B29C 66/91651* (2013.01); *B29C 66/932* (2013.01); *B29C 66/934* (2013.01); *B29C 66/961* (2013.01); *B29C 66/9672* (2013.01); *B29C 65/62* (2013.01); *B29C 66/0384* (2013.01); *B29C 66/71* (2013.01); *B29C 66/80* (2013.01); *B29C 66/9241* (2013.01); *B29L 2031/30* (2013.01); *B29L 2031/485* (2013.01); *B29L 2031/723* (2013.01)

(58) Field of Classification Search
  CPC ... B29C 66/932; B29C 66/934; B29C 66/961; F27B 9/28; F27D 2099/0008
  USPC ..... 219/542, 388, 78.01, 553, 536; 156/499, 156/544, 157, 322
  See application file for complete search history.

(56) References Cited

U.S. PATENT DOCUMENTS

| 4,518,845 | A | * | 5/1985 | Svendsen | G03D 13/002 219/216 |
|---|---|---|---|---|---|
| 9,446,555 | B2 | * | 9/2016 | Hupp, Sr. | B29C 66/83413 |
| 2004/0056077 | A1 | * | 3/2004 | Ito | B29C 66/8362 228/235.2 |
| 2004/0194872 | A1 | * | 10/2004 | Zurmuehle | B29C 66/86533 156/157 |
| 2006/0196607 | A1 | * | 9/2006 | Halfmann | B29C 66/472 156/359 |
| 2009/0314767 | A1 | * | 12/2009 | Chen | B29C 66/81422 219/553 |
| 2010/0326964 | A1 | * | 12/2010 | Gubler | B29C 65/305 219/78.01 |
| 2012/0230363 | A1 | * | 9/2012 | Ott | B29C 66/961 374/21 |

FOREIGN PATENT DOCUMENTS

| DE | 49995 | 9/1966 |
|---|---|---|
| DE | 102006016695 | 10/2007 |
| GB | 882740 A | 11/1961 |

\* cited by examiner

APPARATUS FOR BONDING OVERLAPPING MATERIAL LAYERS

RELATED APPLICATIONS

This application claims priority from and incorporates by reference European Patent Application 16 179 503.4 filed on Jul. 14, 2016.

FIELD OF THE INVENTION

The invention relates to a method for thermally induced seam bonding of weldable and/or gluable flat flexible material layers with each other, wherein the material layers are configured as a material web, a material band and/or a material piece and are arranged at least partially overlapping using an automatic bonding apparatus using at least one electrical contact heating arrangement that is arranged at a carrier frame of the automatic bonding apparatus with a directly electrically powered and heatable heating wedge for locally heating at least one of the material layers to be bonded to a bonding temperature and at least one contact pressure and feed roller arranged at the carrier frame and driven by an electric motor for locally compressing a heated material portion of the material layer, wherein an electronic control for adjustment and/or controlling a relative velocity v between the material layers and the automatic bonding apparatus and a temperature T and/or an electrical power P of a heating resistor arranged between two electrodes of the heating wedge is being used.

The invention furthermore relates to an automatic bonding apparatus for thermally induced seam bonding of weldable and/or gluable flat flexible material layers with each other which are configured as a material web, and/or as a material band and which are arranged at least partially overlapping wherein the automatic bonding apparatus is configured to perform the method described supra.

BACKGROUND OF THE INVENTION

It is known in the art to bond foil and sealing material webs from thermoplastic synthetic material and fabrics coated with a thermoplastic synthetic material at overlapping edges with each other through a heated wedge welding method, in particular weld them together fluid tight. Thus, the heating wedge that locally plasticizes the synthetic material webs to be connected is typically heated directly or indirectly. It is furthermore known to bond material pieces or material bands with a material layer which are made from a thermoplastic material or which are coated with the thermoplastic material. It is furthermore known to bond the material layer by gluing with a heated wedge gluing method instead of welding. Thus, typically a thermally activatable glue layer is applied to one of the material layers to be connected in the provided connecting portion wherein the glue layer is melted by the heated wedge.

A plurality of automatic bonding apparatuses in the form of welders or automatic welders are known in the art for performing the heated wedge welding method. All the known devices and the methods used have in common that the materials to be welded are lifted at their edges and surfaces oriented towards each other are plasticized by the heated heating wedge and subsequently pressed together by contact pressure rollers with a sufficient force. In the art also a plurality of gluing apparatuses or automatic gluing apparatuses for performing the heated wedge glue connecting method is known. Also in these known devices and methods a center layer that is to be connected is locally coated with hot melt glue and heated by the heating wedge until the glue is plasticized and subsequently compressed with sufficient force by contact pressure rollers.

Welding seams or glue seams of this type have to be tight long term and/or have sufficient strength. It is well known that a quality of connecting seams produced by a heated wedge method is highly dependent upon the process parameters used. For a safe bonded connection in particular a velocity is relevant by which the heating wedge is run along the material layers, a temperature of the heating wedge which loads the material portions to be connected with temperature and a contact pressure that is imparted by the contact pressure rollers upon the material portions to be connected. These important process parameters are typically automatically monitored and controlled in automated bonding methods. For this purpose arrangements for detecting a temperature of the heating wedge and the welding velocity and the contact pressure are provided which facilitate displaying the parameters and adjusting and changing the parameters through an integrated apparatus control.

Regarding prior art methods and apparatus for connecting material layers according to the heated wedge bonding method reference is made to the application publication document EP 1 464 471 A1. Furthermore different heating wedges for performing the heated wedge welding method are known for example from the printed documents U.S. Pat. No. 2,870,308 A, DD 49 995 A1 and DE 10 206 016 695 A1.

It is perceived to be a disadvantage of known automatic heating wedge bonding apparatuses and the bonding methods performed therewith that the heating wedges used have a relative large mass which prevents quick heating and cooling of the heating wedge with a necessary adaptation of temperature or power of the heating wedge during the welding process which is required for example due to occurring velocity changes during welding in order to assure a constant weld quality.

BRIEF SUMMARY OF THE INVENTION

Based on these findings, it is an object of the invention to propose an option where the directly electrically powered heating wedge reacts quickly to electrical power adjustments which are triggered by changes of the relative velocity between the plastic materials and the bonding and the automatic bonding apparatus.

The object is achieved according to the invention by a method for thermally induced seam bonding of weldable or gluable flat flexible material layers with each other which are each configured as a material web, a material band or a material piece and which are arranged at least partially overlapping, the method including the steps: using an automatic bonding apparatus; using at least one electrical contact heating arrangement that is arranged at a carrier frame of the automatic bonding apparatus with a directly electrically powered and heatable heating wedge for locally heating at least one of the material layers to a bonding temperature; using at least one contact pressure and feed roller arranged at the carrier frame and driven by an electric motor for locally compressing a heated material portion of the at least one material layer; using an electronic control for adjusting or controlling a relative velocity between the material layers and the automatic bonding apparatus and a temperature or an electrical power of a heating resistor arranged between two electrodes of the heating wedge; monitoring the relative velocity and the temperature or the electrical power of the heating wedge during a bonding process at least in predetermined time intervals; automatically adjusting the electrical power of the heating resistor upon a change of the relative velocity as a function of a determined relative velocity; increasing the electrical power of the heating resistor upon an increase of the relative velocity; and decreasing the electrical power of the heating resistor upon a decrease of the relative velocity.

The object is also achieved by an automatic bonding apparatus for thermally induced seam bonding of weldable or gluable flat flexible material layers with each other which are each configured as a material web, a material band or a material piece and are arranged at least partially overlapping, the automatic bonding apparatus including: at least one electrical contact heating arrangement that is arranged at a carrier frame of the automatic bonding apparatus and includes a directly electrically powered and heatable heating wedge for locally heating at least one material layer of the flat flexible material layers to a bonding temperature, and at least one contact pressure and feed roller arranged at the carrier frame and driven by an electric motor for locally compressing a heated material portion of the at least one material layer, wherein an electronic control is used for adjusting or controlling a relative velocity between the flat flexible material layers and the automatic bonding apparatus and a temperature or an electrical power of a heating resistor arranged between two electrodes of the heating wedge, wherein the heating resistor is formed by a folded steel sheet blank whose kink forms a heating wedge tip and whose edges that extend parallel to the kink are attached at the two electrodes, wherein the electronic control is configured as described supra.

Accordingly the method according to the invention for thermally induced seam bonding of the weldable and/or gluable flat flexible material layers with each other which are configured as a material web, material band/and or a material piece and which are arranged at least partially overlapping monitors a relative velocity v between material layers and the automatic bonding apparatus and a temperature and/or the electrical power of the heating wedge at least in the predetermined time intervals during the bonding process, wherein an electrical power P of the heating wedge is automatically adjusted as a function of a detected relative velocity v when a change of the relative velocity v is detected. Thus, an electrical power of the heating wedge is increased during an increase of the relative velocity v and an electrical power of the heating wedge is reduced during a decrease of the relative velocity v so that either the temperature of the heating wedge or an amount of thermal energy transmitted from the heating wedge to the connecting portions of the material layer remains constant independently from the relative velocity v. This method can be used for a movable as well for a stationary automatic bonding apparatus, wherein primarily an amount of thermal energy transmitted by the heating wedge to bonding portions of the material layer is maintained constant, but not a temperature of the heating wedge. A relative velocity v in this context is a velocity at which a movable automatic bonding apparatus moves relative to the material layers and at which the material layers move relative to a stationary bonding apparatus.

In an advantageous embodiment of the method according to the invention an amount of thermal energy transferred to the material layers to be connected is maintained constant irrespective of the relative velocity v. This means in particular that an identical amount of thermal energy is transmitted by the heating wedge to the connecting portions of the material layers for any relative velocity. This means that plasticizing the material layers or the glue layer of the material layers is performed continuously. In order to achieve this an electrical power P of the heating resistor is selected as a function of a relative velocity v between the material layers and the automatic bonding apparatus, this means it is respectively adjusted anew when the relative velocity v changes, wherein the electrical power P is increased when an increase of the relative velocity v is provided and an electrical power P is reduced when the relative velocity v is reduced.

Advantageously an electrical power P of the heating resistor of the heating wedge is controlled by the electronic control and thus an actual value $P_I$ of the power P is maintained constant with respect to a nominal value $P_S$ of the power P, wherein the user can advantageously predetermine at least a nominal value $P_S$ of the power P. Thus, the relative velocity v and the electrical power of the heating wedge is automatically determined at least in predetermined time intervals during the connecting process. When there are deviations of the actual valve $P_I$ from the nominal value $P_S$ at the detected relative velocity v the differences are immediately and automatically compensated by the electronic control.

In an advantageous embodiment of the invention the electrical power $P_I$ of the heating resistor is determined by a measurement of a voltage drop at the electrodes of the heating wedge and by a measurement of a current running through the heating resistor of the heating element. This facilitates an exact determination of a current power P of the heating resistor in a simple manner. Thus, also small differences between the detected actual value $P_I$ and the predetermined nominal valve $P_S$ can be determined reliably.

In an embodiment of the method according to the invention the nominal value $P_S$ of the power P is internally divided by the electrical control into a nominal value portion $P_{Sn}$ that is useable for the welding or gluing process and a nominal value portion $P_{Sv}$ that is not usable for the welding or gluing process. The power losses $P_{Sv}$ are a function of the wedge and wedge connection geometry.

Advantageously the nominal value portion $P_{Sn}$ is determined in an embodiment of the method according to the invention internally by the electronic control from a nominal value $ED_{Sn}$ of an energy density of the eating wedge, the relative velocity of the heating wedge relative to the material layers and a width B of the heating wedge, wherein the nominal value portion of $P_{Sn}$ is a product of the nominal value $ED_{Sn}$ of the energy density of the heating wedge, the relative velocity v and the width B.

Keeping energy density constant facilitates a particularly uniform quality of the welding or gluing bond. The energy density is a measure for energy transferred to a material and thus also a measure for the temperature of the material after energy transmission. For each material there is an optimum energy density which leads to optimum possible seam quality. With the energy density $ED_{Sn}$ and the non-useable nominal value portion $P_{Sv}$ material properties of the material layers to be welded and/or glued together as well as the special properties of the heating wedge or the glue are being considered.

The electronic control determines the electrical power of the contact heating arrangement by measuring the voltage drop through the heating arrangement and the electrical current through the heating arrangement. The relative velocity v, this means the connecting velocity is determined for example through the speed of a drive unit for the at least one contact pressure and feed roller driven by the electric motor and the width of the heating arrangement is determined by the user and entered into the electrical control.

Furthermore it has proven particularly advantageous that in an embodiment of the method according to the invention at least the nominal value $P_S$ of the power P of the heating wedge, the non-usable nominal value portion $P_{Sv}$ of the power P of the heating wedge and/or the nominal value $ED_{Sn}$ of the energy density is predetermined by the user of the automatic bonding apparatus. Thus, the power of the heating wedge can be adapted to different materials and/or thicknesses of the material layers to be connected with each other and/or to different wedge and wedge connection geometries, in particular the power can be adjusted appropriately before the welding and/or gluing process.

Advantageously in an embodiment of the method recited supra the temperature of the heating wedge is adjusted and/or controlled by the electronic control at least during preheating of the heating resistor before the actual connection process. In order to determine a temperature of the heating wedge in particular a temperature dependent electric resistance of the heating resistor is measure. Advantageously, thus the electric resistance of the heating resistor is determined by a measurement of a voltage drop at the electrodes and by measuring the current through the heating resistor. Thus, a current temperature of the heating resistor can be measured and adjusted as required.

The electronic control determines the temperature dependent electrical resistance R of the directly electrically powered heatable heating wedge and controls the temperature dependent electrical resistance R and thus keeps the value R constant with respect to a nominal value $R_S$. This type of control is advantageously only used for preheating, this means for a few seconds before the actual welding or gluing process. The determined resistance values can also be optionally converted into a temperature value, thus also using a previously captured resistance temperature diagram.

The automatic bonding apparatus for thermally induced seam bonding of weldable and/or gluable flat flexible material layers with each other which are configured as a material web, material band and/or a material piece and which are arranged at least partially overlapping by heated wedge welding or heated wedge gluing includes an electronic control which is configured to perform the method described supra. As is known in the art the electronic control includes at least one electrical heating arrangement that is arranged at a carrier frame of the bonding apparatus and which includes a directly electrically powered heating wedge for edge welding at least one of the material layers and/or for melting a glue that is arranged at least at one of the material layers and furthermore includes at least one contact pressure and feed roller that is driven by an electric motor and arranged at the carrier frame for compressing the material layers to be connected after locally heating in predetermined bonding portions. The electronic control is provided for adjusting and/or controlling the relative velocity v between the material layers and the automatic bonding apparatus and for adjusting and/or controlling the temperature T and/or the electrical power P of the heating resistor arranged between the two electrodes of the heating wedge. Thus, the heating resistor is formed by a folded steel sheet blank whose kink forms a heating wedge tip and whose edges extending parallel to the kink are attached at the electrodes. The automatic bonding apparatus according to the invention can be a self-propelled automatic apparatus which moves relative to the material layers or a stationary automatic bonding apparatus where the material layers are moved relative to the bonding apparatus.

Advantageously the steel sheet metal blank includes meandering cut windings which extend between the electrodes. The meandering windings determine an effective length and width of the heating resistor. A geometry of the windings of the steel sheet metal blank as well as a material from the steel sheet blank is produced determine a cold resistance and a hot resistance of the heating resistor.

In order to facilitate quick reaction times of the resistor the steel sheet metal blank has low mass. This is achieved in particular in that its thickness is between 0.1 mm and 1.0 mm and/or a maximum mass of the heating resistor does not exceed 50 g.

In an advantageous embodiment of the automatic bonding apparatus according to the invention the heating resistor is configured concave, advantageously configured concave on both sides, in particular in a front portion that is oriented towards the at least one contact pressure and feed roller. The heating resistor in this portion has in particular the same curvature radii as the at least one contact pressure and feed roller. This facilitates that the material layers run past the heating wedge are kept in contact with the heating wedge before being compressed by the contact pressure and feed roller through an outer circumference of the contact pressure and feed roller at the heating resistor which influences the heating of the material layers favorably.

In an advantageous embodiment of the automatic bonding apparatus according to the invention that is configured as an automatic welding or gluing apparatus arrangements are provided which press the contact heating arrangement with an adjustable force against the at least one contact pressure and feed roller. Thus, the portions to be connected of the material layers that are to be welded or glued together are clamped between the heating wedge and the at least one contact pressure and feed roller and thus pressed against the heating wedge which facilitates heating the material layers.

The heating wedge is operated in a safe low voltage range (SELV) and directly loaded with electrical current depending on applicable standards with 30-50 V at the most.

The method according to the invention for seam bonding weldable or gluable material layers according to the heated wedge bonding method has the advantage that the bonding velocity can be varied during the bonding process, this means increased or reduced at will without a quality of the generated welding or gluing seams suffering. This is achieved in that changing the relative velocity between the material layers to be connected and the contact heating arrangement also automatically adapts the electrical power of the heating resistor through the control electronics of the automatic bonding apparatus wherein the control electronics change the electric power of the heating resistor so that thermal energy imparted upon the material remains constant independently from relative velocity, this means from the welding or gluing velocity. The invention has many advantages for users, customers as well as for the manufacturer. The heating wedge for example provides quick reaction times under power changes due to its low mass and thus facilitates quick heating and cooling and thus power or velocity adaptation during the bonding process. The heating wedge furthermore facilitates high surface temperatures and is thus suited in particular for bonding coated materials at higher speeds. The heating wedge is producible in a cost effective manner which in turn leads to lower operating costs. Furthermore no temperature sensor is required for detecting the heating wedge temperature wherein the temperature sensor is subject to wear and corrosion.

An additional advantage is the automatic adaption of the heating power to the velocity by regulating energy density which has a positive impact on a quality of the bonding seam.

Furthermore the employed low safety voltage makes it risk free to touch the heating wedge. Furthermore the heating wedge cools down quickly when the operating voltage is turned off so that unwanted touching of the heating wedge does not lead to burn injuries during stand by operations.

The automatic bonding apparatus according to the invention can be used for edge bonding of the plastic material webs or foils, for edge seams of commercial banners or truck tarps or for applying reinforcement patches to material layers of this type. Another application is the so called 3-D welding or 3-D gluing during which blanks of synthetic material foils and tarps are bonded along their seams with a material base web. Thus, for example inflatable boats or sports jackets are welded similar to a sewing machine. Another application is applying bands at a material layer, this means connecting so called tapes with any base material by direct welding or gluing with a thermally activated glue like e.g. applying tapes for seam sealing of sewn seams of sports garments.

BRIEF DESCRIPTION OF THE DRAWINGS

Subsequently the invention is described in more detail with reference to two embodiments illustrated in the drawing figure. Additional features of the invention can be derived from the subsequent description of the embodiment of the invention in combination with the claims and the appended drawing figure. The individual features of the invention can be implemented individually or in combination in various embodiments of the invention, wherein:

DETAILED DESCRIPTION OF THE INVENTION

Figure 1:
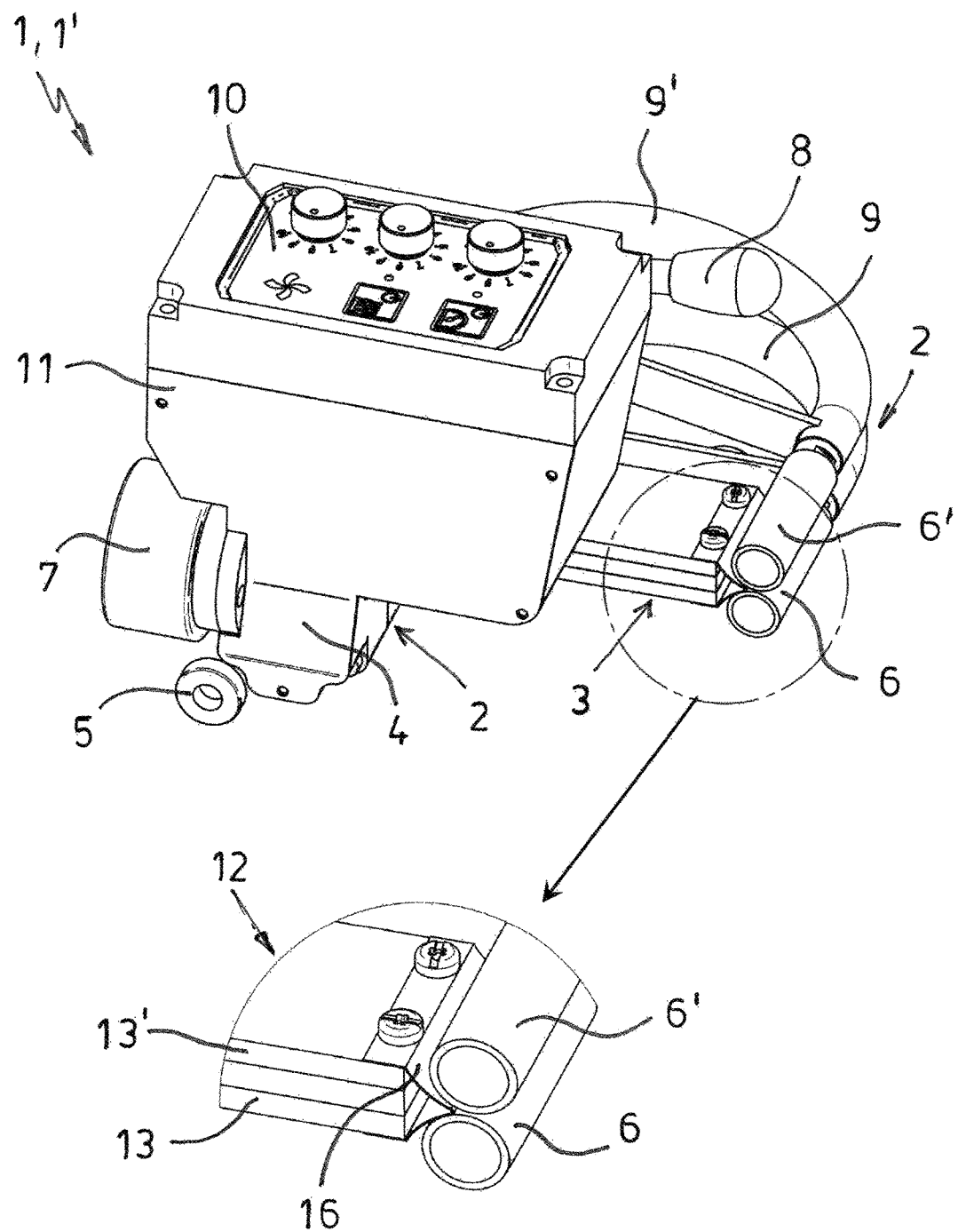
FIG. 1 illustrates a mobile self-propelled automatic bonding apparatus according to the invention in a schematic perspective view.

FIG. 1 illustrates an embodiment of an automatic bonding apparatus 1 according to the invention which is configured as a mobile self-propelled automatic welding apparatus 1' for overlapping edge welding of thermoplastic synthetic material webs that are not illustrated in the drawing figure. The automatic welding apparatus 1' includes a chassis 2 with a contact heating arrangement 3 arranged at the chassis for edge melting of synthetic material webs, wherein the chassis 2 has a carrier frame 4 at which plural running rollers 5 that are offset from each other and two opposite contact pressure and feed rollers 6, 6' are arranged. The lower contact pressure and feed roller 6 is fixated in place and the other upper contact pressure and feed roller 6' is pivot ably supported. The automatic welding apparatus 1' furthermore includes a drive arrangement 7 that is only partially illustrated in the drawing figure for the contact pressure and feed rollers 6, 6'. The running rollers 5 are provided for support on a base, the drive and feed rollers 6, 6' are provided for passing an edge of the overlapping synthetic material webs through and the drive arrangement 7 is provided for driving the contact pressure and feed rollers 6, 6'.

Furthermore a clamping device 8 is arranged at the carrier frame 4 for pressing the upper contact pressure and feed roller 6' against the lower feed roller 6. The lower contact pressure and feed roller 6 is arranged at a lower longitudinal outrigger 9 which is permanently connected with the carrier frame 4. Differently therefrom the upper contact pressure and feed roller 6' is arranged at an upper longitudinal outrigger 9' which is pivotably attached at the carrier frame 4 and pivotable in a direction or against a direction of the lower longitudinal outrigger 9. The clamping device 8 force loads the upper longitudinal outrigger 9' and presses it in a direction towards the lower longitudinal outrigger 9 until the two contact pressure and feed rollers 6 and 6' contact each other.

The welding apparatus 1' furthermore includes an electronic control 10 which is arranged in a housing 11 that is supported by the carrier frame 4. The electronic control 10 is provided for adjusting and/or controlling a relative velocity v between the plastic material webs and the automatic welding apparatus 1' and for adjusting and/or controlling the temperature T and/or the electrical power P of the contact heating arrangement 3.

Figure 2:
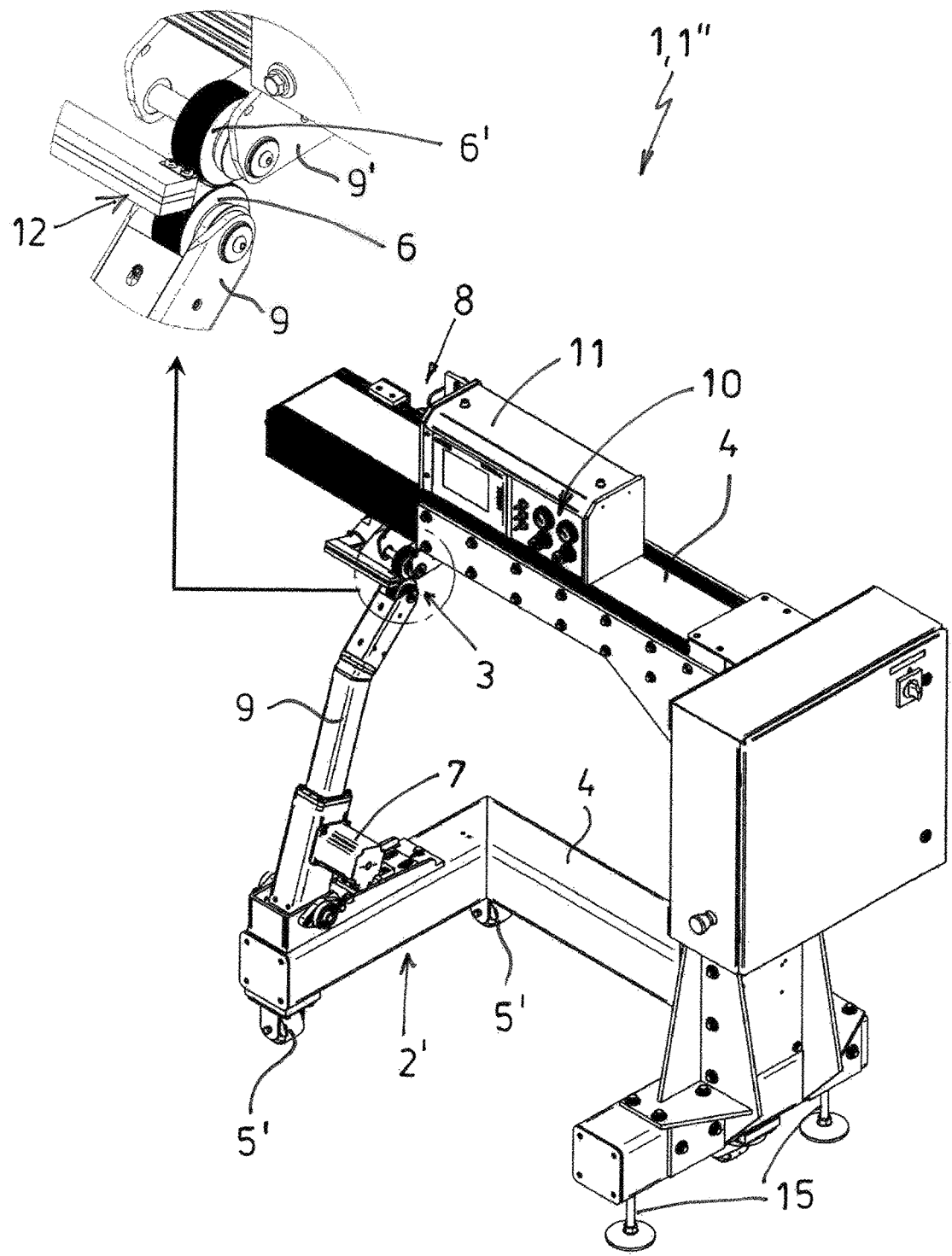
FIG. 2 illustrates a stationary automatic bonding apparatus according to the invention in a schematic perspective view.

FIG. 2 illustrates an embodiment of an automatic bonding apparatus 1 according to the invention configured as a stationary welding apparatus 1" for thermally induced seam bonding of material layers that are not illustrated in the drawing figure. The automatic welding apparatus 1" includes a stand frame 2' with a contact heating arrangement 3 arranged thereon for heating, surface melting and/or completely melting at least one of two material layers to be connected with each other in a connecting portion which is advantageously arranged proximal to an edge, wherein the stand frame 2' has a carrier frame 4 wherein two transport rollers 5' and two stand bases 15 are arranged at a bottom of the carrier frame and two contact pressure and feed rollers 6, 6' arranged opposite to each other are arranged at the carrier frame 4, wherein the contact pressure and feed rollers contact each other and one contact pressure and feed roller is supported locally fixated and the other contact pressure and feed roller is arranged movable relative thereto. The transport rollers 5' facilitate transporting the automatic welding apparatus 1" to a set up location and they carry the transport frame 4 during operation of the welding apparatus 1" together with the stand bases 15 which are configured for support on a base. The drive and feed rollers 6, 6' are provided for passing a connecting portion of the overlapping material layers through and the drive device is provided for driving the contact pressure and feed rollers 6, 6'. The welding apparatus 1' furthermore includes a drive arrangement 7 for the contact pressure and feed rollers 6, 6'.

Additionally a clamping device 8 that is not illustrated in the drawing figure is arranged at the support frame 4 for pressing the upper and the lower contact pressure and feed roller 6, 6' against each other. The lower contact pressure and feed roller 6 is arranged at an upward extending outrigger 9 which is permanently connected with the support frame 4 in a rigid manner. Differently therefrom the upper contact pressure and feed roller 6' is arranged at an upper downward extending outrigger 9' which is movably attached at the support frame 4. The upper outrigger 9' is pivotable and/or moveable in or against a direction of the lower outrigger 9. The clamping device 8 loads the upper outrigger 9' with force and presses it in a direction towards the lower outrigger 9 until the two contact pressure and feed rollers 6 and 6' are in contact with each other.

The welding apparatus 1" furthermore includes an electronic control 10 which is arranged in a housing 11 supported by the carrier frame 4. The electronic control 10 is provided for adjusting and/or controlling the relative velocity v between the plastic material webs and the welding apparatus 1' and for adjusting and/or controlling the temperature T and the electric power P of the contact heater 3.

Figure 3A:
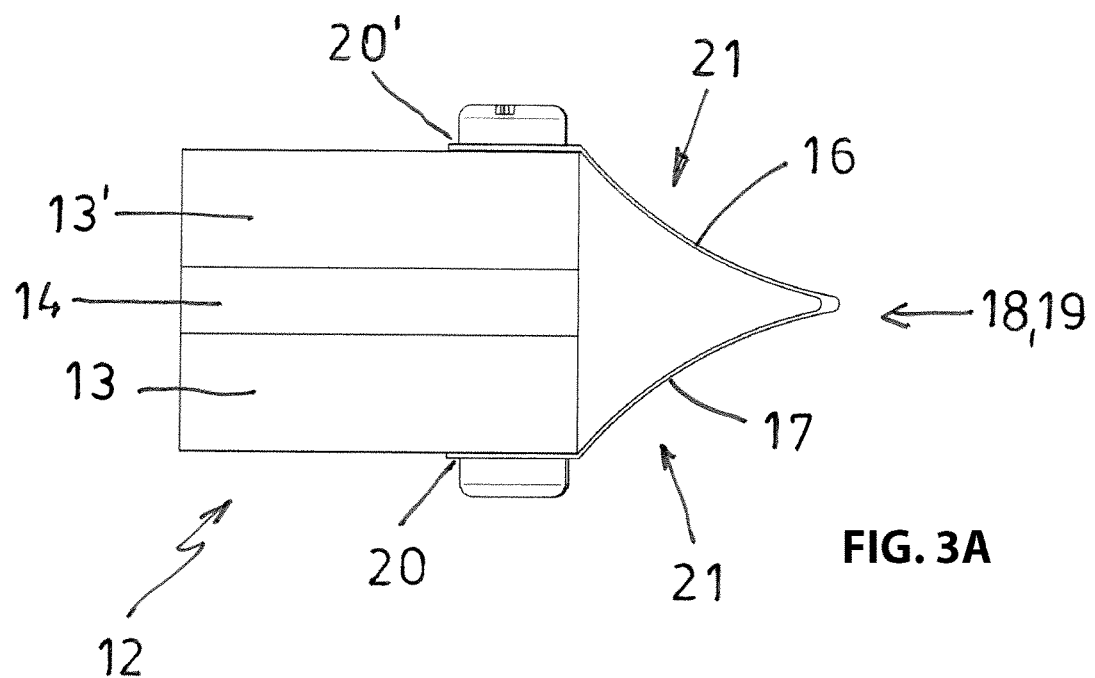
FIG. 3 illustrates the heating wedge of FIG. 1 or 2 in an enlarged schematic view, in side view FIG. 3A and in front view FIG. 3B.
Figure 3B:
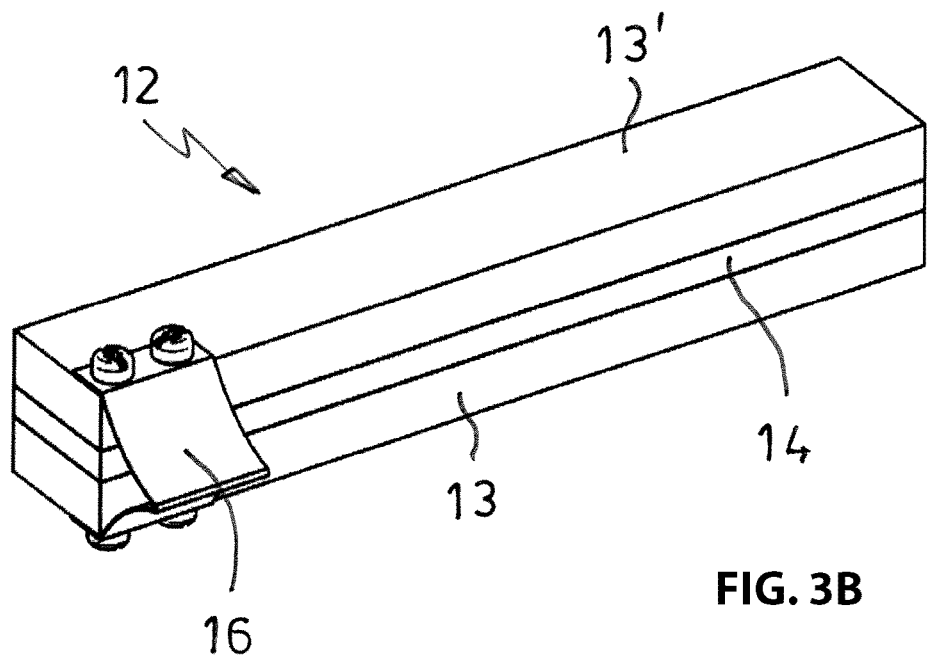

FIG. 3 illustrates the contact heating arrangement 3 of FIG. 1, 2 from a side and from a front. The contact heating arrangement 3 includes a directly electrically powered heatable heating wedge 12 for heating surface melting or completely melting the surface of at least one of the two material layers to be welded or glued together and two electrodes 13, 13' through which the heating wedge 12 is advantageously movably attached at the carrier frame 4. From the two electrodes 13, 13' which are threaded together in the illustrated embodiments through an insulating piece 14 conductors lead to the electronic control 10.

According to FIG. 3a the heating wedge 12 includes a heating resistor 16 which is connected with the two electrodes 13, 13' mechanically and electrically. The heating resistor 16 is formed by a folded steel sheet blank 17 whose center kink location 18 forms a heated wedge tip 19 and whose outer edges 20, 20' are attached at the electrodes 13, 13'. The steel sheet blank 17 has a typical thickness between 0.1 and 1.0 mm and advantageously a maximum mass of 50 g. The heating resistor 16 is formed concave in a front portion 21 that is proximal to the heating wedge tip 19. In this portion 21 the heating resistor 16 has the same curvature radii as the two contact pressure and feed rollers 6, 6'. The contact heating arrangement 3 can be pressed with an adjustable force which is imparted by a force generator that is not illustrated in the figures against the two contact pressure and feed rollers 6, 6'.

What is claimed is:

1. An automatic bonding apparatus for thermally induced seam bonding of weldable or gluable flat flexible material layers with each other which are each configured as a material web, a material band or a material piece and are arranged at least partially overlapping, the automatic bonding apparatus comprising:
   at least one electrical contact heating arrangement that is arranged at a carrier frame of the automatic bonding apparatus and includes
   a directly electrically powered and heatable heating wedge for locally heating at least one material layer of the flat flexible material layers to a bonding temperature, and
   at least one contact pressure and feed roller arranged at the carrier frame and driven by an electric motor for locally compressing a heated material portion of the at least one material layer,
   wherein an electronic control is used for adjusting or controlling a relative velocity between the flat flexible material layers, the automatic bonding apparatus, a temperature, an electrical power of a heating resistor, and the heating resistor arranged between two electrodes of the heating wedge that are separated by a flat insulating element,
   wherein the electronic control is configured to monitor the relative velocity and the temperature or the electrical power of the heating wedge during a bonding process at least in predetermined time intervals,
   wherein the electronic control is configured to automatically adjust the electrical power of the heating resistor upon a change of the relative velocity as a function of a determined relative velocity,
   wherein the electronic control is configured to increase the electrical power of the heating resistor upon an increase of the relative velocity,
   wherein the electronic control is configured to increase the electrical power of the heating resistor upon an increase of the relative velocity,
   wherein the electronic control is configured to decrease the electrical power of the heating resistor upon a decrease of the relative velocity,
   wherein the heating resistor is formed by a folded steel sheet blank whose kink forms a heating wedge tip and whose edges that extend parallel to the kink are attached at the two electrodes,
   wherein the heating wedge tip is arranged in a center plane of the flat insulating element and the folded steel blank is arranged mirror symmetrical to the center plane of the flat insulating element,
   wherein the heating resistor includes two sides that are oriented away from each other and configured to contact the weldable or gluable flat flexible material layers, and
   wherein an entirety of each of the two sides is concave.

2. The automatic bonding apparatus according to claim 1, wherein the steel folded sheet blank includes meandering cut windings which extend between the two electrodes.

3. The automatic bonding apparatus according to claim 1, wherein the folded steel sheet blank has a thickness between 0.1 mm and 1.0 mm and a maximum mass of 50 g.

4. The automatic bonding apparatus according to claim 1, wherein the entirety of each of the two sides has identical radii with the at least one contact pressure and feed roller.

5. The automatic bonding apparatus according to claim 1, wherein the at least one electrical contact heating arrangement presses against the at least one contact pressure and feed roller with an adjustable force.

6. The automatic bonding apparatus according to claim 1, wherein a thermal energy that is transmitted from the heating wedge to the at least one material layer is maintained constant independently from the relative velocity.

7. The automatic bonding apparatus according to claim 1, wherein the electrical power of the heating resistor is controlled by the electronic control and an actual value of the electrical power of the heating resistor is kept constant relative to a nominal value of the electrical power of the heating resistor.

8. The automatic bonding apparatus according to claim 7, wherein the actual value of the electrical power of the heating resistor is determined by measuring a voltage drop at the two electrodes of the heating wedge and by measuring an electrical current through the heating resistor of the heating wedge.

9. The automatic bonding apparatus according to claim 7, wherein the nominal value of the electrical power of the heating resistor is internally separated by the electronic control into a nominal value portion that is usable for the bonding process and a nominal value portion that is not usable for the bonding process.

10. The automatic bonding apparatus according to claim 9,
   wherein the nominal value portion that is usable for the bonding process is internally determined by the electronic control from a nominal value of an energy density of the heating wedge, the relative velocity v and a width of the heating wedge, and wherein the nominal value portion that is usable for the bonding process is a product of the nominal value of the energy density, the relative velocity, and the width of the heating wedge.

11. The automatic bonding apparatus according to claim 10, wherein at least the nominal value of the power of the heating resistor or the non-useable nominal value portion of the power P of the heating resistor or the nominal value of the energy density of the heating wedge is predetermined by a user of the automatic bonding apparatus.

12. The automatic bonding apparatus according to claim 1, wherein a temperature of the heating wedge is adjusted or controlled by the electronic control at least during preheating of the heating resistor before an actual bonding process.

13. The automatic bonding apparatus according to claim 12, wherein a temperature dependent electrical resistance of the heating resistor is measured in order to determine the temperature of the heating wedge.

14. The automatic bonding apparatus according to claim 13, wherein the temperature dependent electrical resistance of the heating resistor is determined from measuring a voltage drop at the two electrodes and from a measuring a current through the heating resistor.

\* \* \* \* \*